United States Patent
Koenck et al.

(10) Patent No.: US 10,031,229 B1
(45) Date of Patent: Jul. 24, 2018

(54) OBJECT DESIGNATOR SYSTEM AND METHOD

(71) Applicant: Rockwell Collins, Inc., Cedar Rapids, IA (US)

(72) Inventors: Steven E. Koenck, Cedar Rapids, IA (US); Mark A. Bortz, Robins, IA (US); T. Douglas Hiratzka, Coralville, IA (US); Michael C. Gokay, Dayton, OH (US)

(73) Assignee: Rockwell Collins, Inc., Cedar Rapids, IA (US)

(*) Notice: Subject to any disclaimer, the term of this patent is extended or adjusted under 35 U.S.C. 154(b) by 273 days.

(21) Appl. No.: 14/570,543

(22) Filed: Dec. 15, 2014

(51) Int. Cl.
*G01S 7/484* (2006.01)
*G01S 17/10* (2006.01)
*G01S 17/02* (2006.01)
*G01S 7/48* (2006.01)
*H04N 5/33* (2006.01)
*G06T 5/50* (2006.01)
*G01B 11/02* (2006.01)

(52) U.S. Cl.
CPC .......... *G01S 17/026* (2013.01); *G01B 11/026* (2013.01)

(58) Field of Classification Search
None
See application file for complete search history.

(56) References Cited

U.S. PATENT DOCUMENTS

| | | |
|---|---|---|
| 3,941,999 A | 3/1976 | Moyers, Jr. |
| 3,947,119 A | 3/1976 | Bamberg et al. |
| 4,151,415 A | 4/1979 | Lipke |
| 4,708,473 A | 11/1987 | Metzdorff et al. |
| 4,866,781 A | 9/1989 | Borken et al. |
| 4,915,498 A | 4/1990 | Malek |
| 4,920,412 A | 4/1990 | Gerdt et al. |

(Continued)

FOREIGN PATENT DOCUMENTS

| | | |
|---|---|---|
| WO | 2004/072678 | 8/2004 |
| WO | 2005/076037 A1 | 8/2005 |
| WO | 2006/090356 A1 | 8/2006 |

OTHER PUBLICATIONS

Unpublished U.S. Appl. No. 14/231,850, filed Apr. 1 2014, and titled "Precision Mobile Baseline Determination Device and Related Method".

*Primary Examiner* — Mohammad J Rahman
(74) *Attorney, Agent, or Firm* — Angel N. Gerdzhikov; Donna P. Suchy; Daniel M. Barbieri

(57) ABSTRACT

An object designator system has a laser light source, and image sensor, a display, and a processor coupled with a non-transitory processor-readable medium storing processor-executable code. The image sensor captures an external scene image. The processor determines a range to an object of interest in the external scene and an exposure delay based on the range. The laser light source emits a laser light pulse into the external scene. The image sensor, based on the exposure delay, captures a laser spot image including laser light pulse reflections, and a spot baseline image of the external scene. The processor determines, based on the laser spot image and the spot baseline image, a location of the laser spot in the external scene and generates a symbol indicative of the location of the laser spot. The processor renders the symbol onto the external scene image to display an integrated image to a user.

16 Claims, 7 Drawing Sheets

(56) References Cited

U.S. PATENT DOCUMENTS

| | | | |
|---|---|---|---|
| 4,969,735 A | 11/1990 | Gilligan | |
| 5,379,676 A * | 1/1995 | Profeta | F41G 3/02 |
| | | | 89/41.05 |
| 5,408,541 A | 4/1995 | Sewell | |
| 5,822,713 A * | 10/1998 | Profeta | F41G 3/02 |
| | | | 342/67 |
| 6,515,737 B2 | 2/2003 | Perry | |
| 7,379,164 B2 | 5/2008 | Inbar et al. | |
| 8,194,126 B2 | 6/2012 | David et al. | |
| 8,378,279 B2 | 2/2013 | Mourar et al. | |
| 9,494,687 B2 * | 11/2016 | Ell | G01S 17/66 |
| 2003/0191568 A1 * | 10/2003 | Breed | B60W 40/06 |
| | | | 701/36 |
| 2007/0058038 A1 * | 3/2007 | David | G01S 7/483 |
| | | | 348/135 |
| 2008/0291075 A1 * | 11/2008 | Rapanotti | F41G 3/02 |
| | | | 342/20 |
| 2010/0194641 A1 * | 8/2010 | Miller | G01S 5/04 |
| | | | 342/417 |
| 2012/0177352 A1 * | 7/2012 | Pillman | H04N 5/2354 |
| | | | 396/61 |
| 2015/0268345 A1 * | 9/2015 | Ell | F41G 7/008 |
| | | | 356/5.01 |
| 2017/0219693 A1 * | 8/2017 | Choiniere | G01S 7/484 |

* cited by examiner

OBJECT DESIGNATOR SYSTEM AND METHOD

BACKGROUND

Object designators have become widespread in military operations such as ranging, marking, targeting and threat identification in recent years and generally work by emitting laser light toward an object so that a laser light is reflected from the designated object. Existing object designators are generally large and heavy and are typically mounted on a vehicle or supported by a tripod, which makes existing object designators difficult to move and carry by individual users in the field.

Further, some existing object designators use a laser wavelength in the non-visible range to avoid detection of the laser spot by enemy forces, which in turn prevents users from seeing the laser spot without a special camera. The ability to observe the laser spot on a designated object is of significant value for correctly placing the laser spot on the desired object and for confirming that the desired object is being designated. The ability of the user to view and observe the laser spot enables laser spot movement or steering to an object of interest that the user wishes to designate.

A further practical consideration for existing object designators is that bright ambient light levels (e.g., on the order of about 1 kW/m$^2$ or between about 32000 lux and about 100000 lux) often result in bright spots or glints (e.g., where a particular pixel in the image is saturated by ambient light) in images of objects captured by existing object designators. These glints may partially or completely obscure or washout laser spots on objects, or may cause false laser spot detections on objects not currently being designated by the object designator. Varying ambient light levels in the external scene result in more powerful lasers being used in existing object designators, which further reduces the portability and increases the size, weight, and power consumption of existing object designators.

SUMMARY

In one aspect, exemplary embodiments of the inventive concepts disclosed herein are directed to an object designator system. The object designator system may include a laser light source configured to emit laser light pulses in an external scene, an image sensor configured to capture an image of the external scene and to detect laser light reflections from the laser light pulses from the external scene, and a display configured to provide at least one image to a user.

A processor may be operably coupled with the laser light source, the image sensor, the display, and with a non-transitory processor-readable medium storing processor-executable code. The code, when executed by the processor may cause the processor to transmit a first control signal via a computer port to the image sensor to cause the image sensor to capture an external scene image with a variable exposure time selected such that the external scene image is visible to a user. The code may also cause the processor to determine a range to an object of interest located in the external scene and an exposure delay based on the range to the object of interest. The code may cause the processor to cause laser light source to emit a laser light pulse having a pulse width into the external scene at a first instant in time. The code may also cause the processor to cause the image sensor to capture a laser spot image of the external scene at a second instant in time and with first exposure parameters including a first exposure time. The first exposure time may be longer than the pulse width, and the second instant in time may be separated from the first instant in time by a period of time determined based on the exposure delay and the pulse width such that the laser spot image includes laser light pulse reflections from the laser light pulse detected by the at least one image sensor during the first exposure time.

The code may also cause the processor to cause the image sensor to capture a spot baseline image of the external scene with the first exposure parameters at a third instant in time selected such that the spot baseline image is devoid of the laser light pulse reflections. The processor may determine, based on the laser spot image and the spot baseline image, a location of the laser spot in the external scene and may generate a symbol indicative of the location of the laser spot in the external scene and render the generated symbol onto the external scene image to generate an integrated image including the initial image of the external scene and the rendered symbol indicative of the location of the laser spot in the external scene. The processor may provide the integrated image to a user via the display.

In some embodiments, the object designator system may also include a positioning device configured to determine a position and an orientation of the object designator system relative to at least one of: the external scene and the object of interest in the external scene.

In some embodiments, the object designator system may have a communications interface coupled with the processor. The communications interface may be configured to transmit data indicative of at least one of: a location of the object of interest in the external scene and the location of the laser spot in the external scene to a remote processor.

In some embodiments, the object designator system may also have a rangefinder including a visible-spectrum pulsed light source and a light detector coupled with the processor, and the range to the object of interest may be determined by the rangefinder.

In some embodiments, the symbol indicative of the location of the laser spot in the external scene may be a graphical symbol or may be a portion of the laser spot image corresponding to the location of the laser spot in the external scene.

In some embodiments, the image sensor may be configured to operate in one or more modes selected from: a visible mode (VIS), a near infrared (NIR) mode, and a shortwave infrared (SWIR) mode.

In some embodiments the laser light pulse may have a wavelength of between about 1000 nm and about 1700 nm. The pulse width may be in the 10 nanosecond range and the first exposure time may be in the microsecond range.

In some embodiments, the pulse width may be between about 2 nanoseconds and about 100 nanoseconds, the first exposure time may be about 1 microsecond, and the laser light pulse may be in the non-visible spectrum.

In some embodiments, the object designator system may also include a communications interface coupled with the processor. The communications interface may be configured to transmit data indicative of the integrated image to a remote processor.

In some embodiments, the variable exposure time may be inversely related to an ambient light level in the external scene.

In a further aspect, embodiments of the inventive concepts disclosed herein are directed to a method of designating an object of interest. The method may include capturing, via an image sensor, an external scene image with a variable exposure time selected such that the external scene image is visible to a user. The method may also include determining a range to an object of interest located in the external scene and determining an exposure delay based on the range to the object of interest. The method may also include emitting a laser light pulse having a pulse width into the external scene at a first instant in time. The method may further include capturing, via the image sensor, a laser spot image of the external scene at a second instant in time and with first exposure parameters including a first exposure time. The first exposure time may be longer than the pulse width, and the second instant in time may be separated from the first instant in time by a period of time determined based on the exposure delay and the pulse width such that the laser spot image includes laser light pulse reflections from the laser light pulse detected by the at least one image sensor during the first exposure time.

The method may further include capturing, via the image sensor a spot baseline image of the external scene with the first exposure parameters at a third instant in time selected such that the spot baseline image is devoid of the laser light pulse reflections, and determining, via a processor coupled with the image sensor, a location of a laser spot in the external scene based on the laser spot image and the spot baseline image. The method may further include generating, by the processor, a symbol indicative of the location of the laser spot in the external scene, generating, by the processor, an integrated image based on the external scene image and the generated symbol, and providing the integrated image to a user via a display.

In some embodiments, the method may also include determining, via a position device coupled with the processor, a position and an orientation of the image sensor relative to at least one of: the external scene and the object of interest in the external scene.

In some embodiments, the method may also include transmitting data indicative of at least one of: a location of the object of interest in the external scene and the location of the laser spot in the external scene to a remote processor, via a communications interface.

In some embodiments, determining the range to the object of interest may include emitting a light pulse toward the object of interest via a rangefinder, and detecting a reflection of the light pulse from the object of interest via a light detector.

In some embodiments, the pulse width may be in the nanosecond range and the first exposure time may be in the microsecond range. For example, the pulse width may be between about 2 nanoseconds and about 100 nanoseconds, and the first exposure time may be about 1 microsecond.

In some embodiments, the method may include decreasing the variable exposure time in response to an increase in a level of ambient light illumination in the external scene so as to minimize ambient light glints in the initial image of the external scene.

BRIEF DESCRIPTION OF THE DRAWINGS

Like reference numerals in the figures may represent and refer to the same or similar element, feature, step, or function. Implementations of the inventive concepts disclosed herein may be better understood when consideration is given to the following detailed description thereof. Such description makes reference to the annexed pictorial illustrations, schematics, graphs, drawings, and appendices, which are not necessarily to scale, and in which some features may be exaggerated and some features may be omitted or may be represented schematically or symbolically in the interest of clarity. In the drawings.

DETAILED DESCRIPTION OF EXEMPLARY EMBODIMENTS

Figure 1:
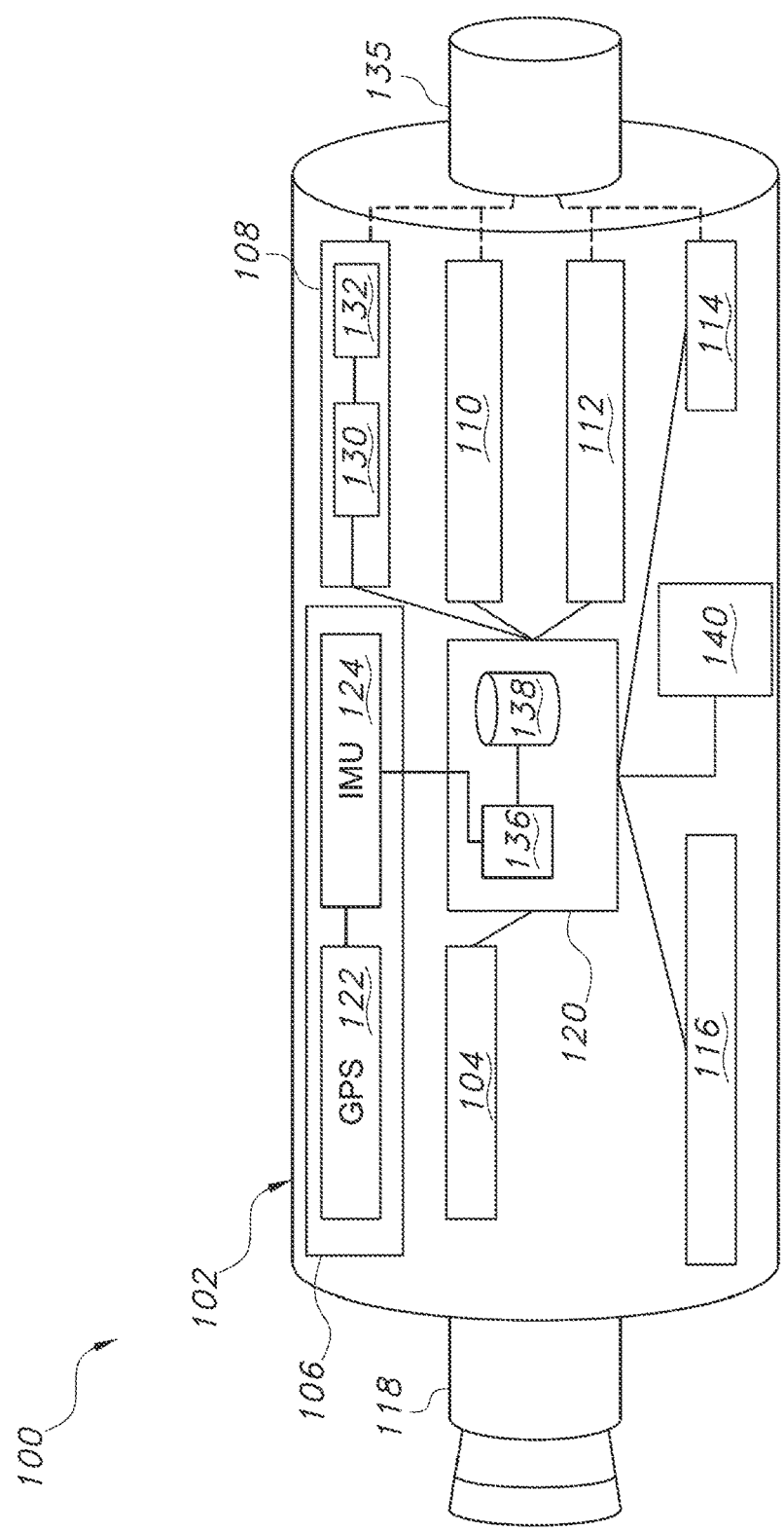
FIG. 1 is a side view diagram of an exemplary embodiment of an object designator system according to the inventive concepts disclosed herein.

Before explaining at least one embodiment of the inventive concepts disclosed herein in detail, it is to be understood that the inventive concepts are not limited in their application to the details of construction and the arrangement of the components or steps set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements, steps, and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "some embodiments," "one embodiment," or "an embodiment" means that a particular element, feature, structure, step, or characteristic described in connection with the embodiment is included in at least one embodiment. The appearances of the phrase "in some embodiments" in various places in the specification are not necessarily all referring to the same embodiment, and embodiments of the inventive concepts disclosed may include one or more of the features described herein, or any combination of sub-combination of two or more such features, along with any other features which may not necessarily be described or inherently present in the instant disclosure.

Broadly, embodiments of the inventive concepts disclosed herein are directed to object designator systems and methods configured to range, mark, and/or designate an object in varying ambient light levels, ranging from full ambient light conditions to low or no ambient light conditions. Further, embodiments of the inventive concepts disclosed herein are directed to object designator systems configured for use where the object and the object designator system are moving relative to one another.

In some instances, object designator systems and methods according to the inventive concepts disclosed herein may be used in military operations to range, mark, and/or designate a one or more targets, friendly or enemy vehicles, personnel, positions, or other objects, personnel, or features of interest. As another example, embodiments of object designator systems and methods according to the inventive concepts disclosed herein may be used in policing applications to range, mark, or designate a vehicle or a subject that are of interest or that are pursued, a hiding place of subjects or vehicles, a location of discarded objects during a pursuit, violent individuals in civil disturbances or riots, undercover or plain clothes police officers in responding units, or other objects for coordinated or collaborative identification, retrieval, pursuit, or capture operations.

Further, embodiments of object designator systems and methods according to the inventive concepts disclosed herein may be used in search and rescue operations to designate crash sites, debris, potential survivors or victims, landing point for medical evacuation or rescue aircraft, last known location of vehicles, victims, or rescuers, fire hydrants, evacuation points, or medical supply drops. As another example, embodiments of object designator systems and methods according to the inventive concepts disclosed herein may be used in farming, animal control, or other similar applications to designate an animal for capture, transport, or medical care.

Figure 2:
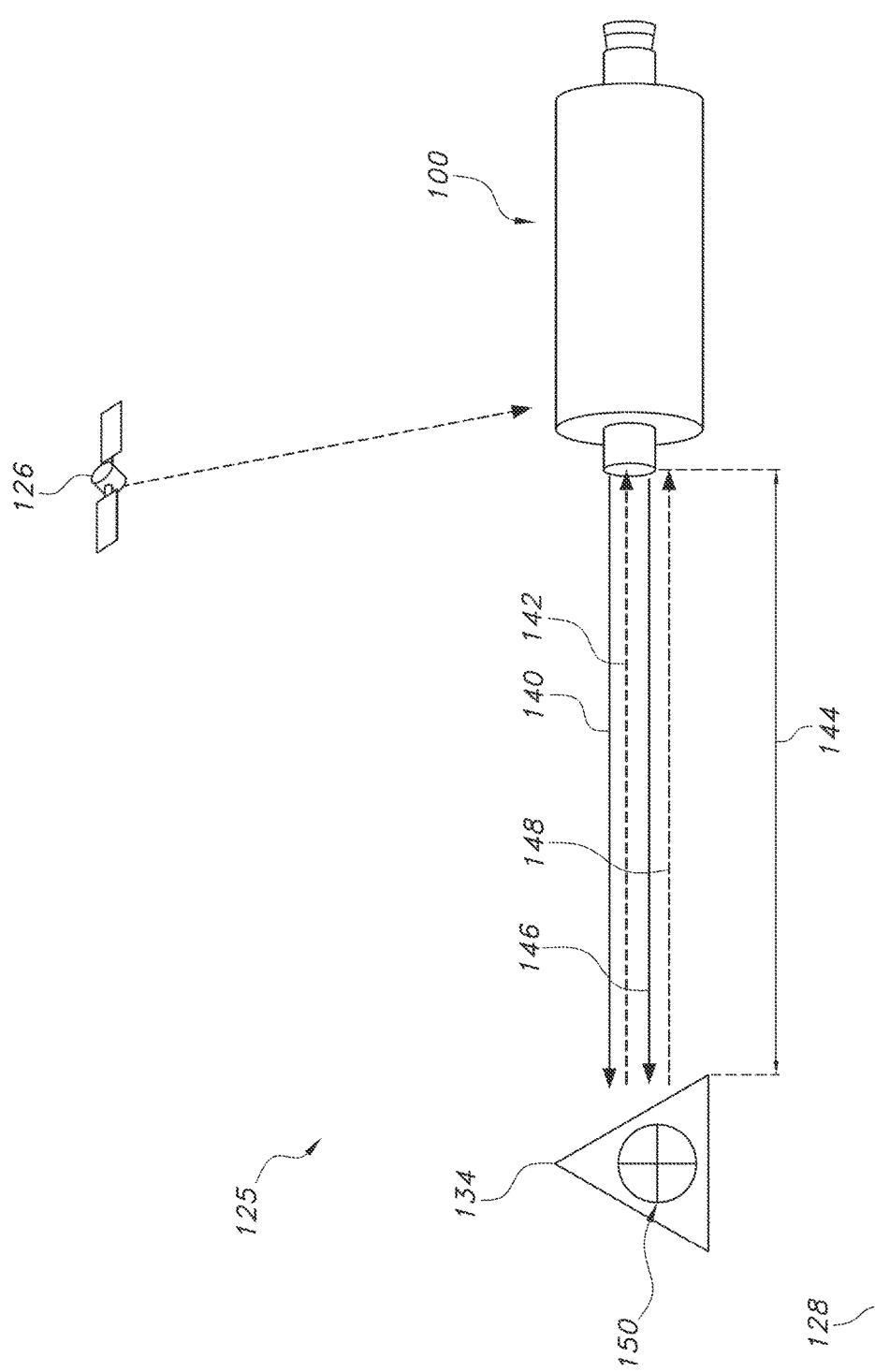
FIG. 2 is a diagram of the object designator system of FIG. 1 shown deployed in an external scene including an object of interest.

Referring now to FIGS. 1-2, an exemplary embodiment of an object designator system 100 according to the inventive concepts disclosed herein is shown. The object designator system 100 includes an external housing 102, a power source 104, a positioning device 106, a rangefinder 108, an illumination source 110, a laser light source 112, an image sensor 114, a communications interface 116, a display 118, and a controller 120.

The object designator system 100 may be sized, shaped, and configured to be conveniently carried by an individual user in the field, and may be handheld, or may be attached to a helmet, a weapon, or a vehicle, or may be supported by a stand in some embodiments. In some applications, the object designator system 100 may be substantially cylindrical and may be about 7.6 centimeters (i.e., about 3 inches) in diameter and about 22.8 centimeters (i.e., about 9 inches) in length, and may weigh about 2.25 kg (i.e., about 5 pounds) or less, and the power source may be configured to provide enough power for a 24-hour continuous operation of the object designator system 100.

The external housing 102 is configured to house and protect the components of the object designator system 100 from moisture, weather, vibrations, dust, or other deleterious conditions, elements, or forces. In some embodiments, the external housing 102 may be shaped, sized, and configured so as to be carried manually by a user, or so as to be attached to a helmet, a weapon system or vehicle, a platform, an aircraft, or combinations thereof. The external housing 102 may be constructed of any desired lightweight durable material such as metals, composites, plastic, resins, thermosets, fiberglass, ceramics, natural or synthetic rubbers, or combinations thereof. The external housing 102 may have any desired shape, such as cylindrical, square, oval, or any other shape configured to be conveniently carried by a user.

The power source 104 is configured to power the object designator system 100 for a desired period of operation, and may be implemented as a rechargeable or disposable battery, a cable, a plug-in port, a USB-port, a solar cell, an induction charger, or combinations thereof. In some embodiments, the power source 104 is configured to provide 24-hours of operation of the object designator system 100. The power source 104 may be fixed or removable. In some embodiments, the power source 104 may be implemented as a power cable to allow the object designator system 100 to be coupled with an external power source such as a battery pack or a vehicle power system.

The positioning device 106 may include a global positioning satellite (GPS) receiver 122, and an inertial measurement unit (IMU) 124 configured to determine the position and/or orientation of the object designator system 100 relative to an external scene 125 as shown in FIG. 2. The GPS receiver 122 may include or may be coupled with an antenna and may be configured to receive one or more positioning signals from one or more positioning satellites 126 and to determine a position of the object designator system 100 in the external scene 125. Data indicative of the position of the object designator system 100 may be provided to the controller 120 by the positioning device 106 and/or may be transmitted to a remote processor via the communications interface 116.

The IMU 124 may be configured to determine the orientation of the objective designator system 100 relative to a ground 128 or to any other coordinate or reference system or point in the external scene 125. In some embodiments, the IMU 124 may be implemented as a micro electro-mechanical system (MEMS) IMU and may include a processor and one or more microsensors. In some embodiments, the positioning device 106 may include a celestial-object measurement and tracking system and/or magnetic sensing system. Data indicative of the orientation of the object designator system 100 determined by the IMU 124 may be transmitted to the controller 120 as described below and/or may be transmitted to a remote processor via the communications interface 116.

In some embodiments, the GPS receiver 122 or the IMU 124 may be omitted, or data from only one of the GPS receiver 122 and the IMU 124 may be obtained as will be appreciated by persons of ordinary skill in the art having the benefit of the instant disclosure.

The rangefinder 108 may include a light source 130 and a detector 132. The light source 130 is optically coupled with the external scene 125 and is configured to emit light pulses in the external scene 125 and/or towards an object of interest 134 in the external scene 125. The light source 130 may be implemented as a laser diode, a vertical surface emitting laser die, a semiconductor laser, a gas laser, a Q-switched laser diode, or combinations thereof, and may include any desired optical elements, such as filters, lenses, collimators, partially-reflective mirrors, or combinations thereof. The light pulses emitted by the light source 130 may be in an eye-safe visible spectrum or a non-visible spectrum, and may be coded, amplitude modulated, or phase-modulated in some embodiments.

The object of interest 134 is symbolically depicted in FIG. 2 as a triangle, but it is to be understood that the object of interest 134 may be a person, a vehicle, building, vegetation, particular location, terrain feature, animal, manmade or natural object, stationary object or feature, moving object or feature, or combinations thereof.

The object of interest 134 may have a reflectivity characteristic at one or more wavelengths of the light source 130 and/or the laser light source 112 to reflect a portion of the light pulses back toward the rangefinder 108.

The object of interest 134 may have any size, shape, cross-section, or combinations thereof, and any number of objects of interest 134 may be present in the external scene 125, such as a single object of interest 134, two or more objects of interest 134, or a plurality of objects of interest 134. Further, where multiple objects of interest 134 are present in the external scene 125, such objects of interest 134 may be different types or sizes and may be located at different ranges from the object designator system 100. The object of interest 134 may be user-selected or may be automatically designated by the object designator system 100 based on range, color, size, shape, movement, estimated location, search parameters provided by a user, being designated by another object designator system 100, location of interest received by the communications interface 116 or provided by the user, or combinations thereof.

The detector 132 is optically coupled with the external scene 125 and is configured to capture or detect reflections of the light pulses from the external scene 125 and/or from one or more objects of interest 134 in the external scene 125 so as to determine a range to the object of interest 134 (e.g., a distance or range between the object designator system 100 and the object of interest 134). The detector 132 may be implemented as an avalanche photodiode or an avalanche photodiode array in some embodiments. In some embodiments, the detector 132 may be configured to detect reflections of the light pulses emitted by another source from the external scene 125 and/or from one or more objects of interest 134 in the external scene 125. The other source may be another known object designator system 100, an unknown object designator system, or an unknown source. Where the detector 132 detects light pulses emitted by another source, the detector 132 may detect and identify a pattern in the light pulses from another source, or may recognize a pattern of the detected light pulses from another source as one of a set of known or previously identified friendly or enemy patterns stored by the controller 120. The detected or identified pattern may be used by the controller 120 to identify the unknown source of the light pulses (e.g., as friendly or enemy), and/or to synchronize the operation of the imaging sensor 114 with the pattern so as to determine a location of the respective laser spot in the external scene 125 and provide a symbol indicative of the location of the respective laser spot to the user.

In some embodiments, the rangefinder 108 may be omitted, and the range to the object of interest 134 may be determined by the laser light source 110 and the image sensor 114 in a similar manner as will be appreciated by a person of ordinary skill in the art having the benefit of the instant disclosure.

The illumination source 110 is optically coupled with the external scene 125 and is configured to provide illumination in the external scene 125 such that the image sensor 114 may capture one or more images of the external scene 125 with a desired illumination level. The illumination source 110 may be implemented as an LED, or as a laser diode emitting laser light in the non-visible, infrared, near infrared, shortwave infrared, or visible spectrum, and may operate continuously or intermittently to provide illumination of the external scene 125 for the image sensor 114 in some embodiments. Where ambient light levels are low, the illumination source 110 may be activated to illuminate the external scene 125 to a desired illumination level.

It is to be understood that the illumination source 110 is optional, and in some embodiments, the object designator system 100 may operate by using passive or ambient illumination.

The laser light source 112 is optically coupled with the external scene 125 and is configured to emit laser light pulses in the external scene 125 and/or towards the object of interest 134. The laser light source 112 may be implemented as a laser diode, a vertical surface emitting laser die, a semiconductor laser, a gas laser, a Q-switched laser diode, or combinations thereof, and may include any desired optical elements, such as filters, lenses, collimators, partially-reflective mirrors, or combinations thereof. The laser light source 112 may be configured to emit laser light pulses with any desired pulse width, amplitude modulation, phase modulation, and combinations thereof. In some embodiments, the laser light source 112 may be configured to emit laser light pulses in the external scene 125 having a substantially constant power, while in some embodiments the laser light source 112 may be configured to emit laser light pulses with an adjustable power based on the range to the object of interest 134 and the ambient light illumination level in the external scene 125 so as to achieve a desired signal-to-noise ratio (e.g., 10:1) in the images captured by the image sensor 114. In some embodiments, the laser light source 112 may emit laser light pulses in the non-visible spectrum (e.g., about 1064 nm or about 1540 nm), and in some embodiments the laser light source 112 may emit laser light pulses in the visible spectrum.

The image sensor 114 is optically coupled with the external scene 125 via a lens system 135, and is configured to capture an image or a sequence of mages of the external scene 125, including reflections from the light pulses emitted by the rangefinder 108 and the laser light pulses emitted by the laser light source 112 indicative of a location of a laser spot in the external scene 125. The image sensor 114 may also be configured to measure, detect, or determine a level of ambient light illumination in the external scene, which may vary from full sunlight in the daytime to low or no ambient light in the nighttime.

The image sensor 114 may be implemented as an analog image sensor, a digital image sensor, a semiconductor charge-coupled device (CCD), or a complementary metal-oxide-semiconductor (CMOS) sensor, and is configured to capture any desired wavelength, and may operate in the visible range, the near infrared (NIR) range, the shortwave infrared range (SWIR). In some embodiments, more the one image sensor 114 may be implemented, such as two or more image sensors 114. The lens system 135 may include a telephoto lens (with the physical length of the lens being shorter than the focal length) and may be configured to provide any desired magnification, filtering, range, focal length, or polarization as will be appreciated by persons of ordinary skill in the art having the benefit of the instant disclosure.

In some embodiments, the image sensor 114 may be configured to capture a single frame or image or a series of frames or images with at least two different exposures or exposure parameters and/or with a variable integration time or exposure time. Imaging the external scene 125 in ambient lighting may be carried out by the image sensor 114 with an exposure time ranging from relatively long (e.g., up to 40 milliseconds or longer) to relatively short (e.g., as low as a few microseconds) in some embodiments.

In some embodiments, the image sensor 114 may be configured to operate in two different exposure modes, an external scene capture mode and a laser spot detection mode as described in detail below. The external scene capture mode may have a relatively long and variable exposure time to image the external scene 125 with ambient illumination so as to optimize the captured image for human vision and optimize the visibility of the object of interest 134 to a user. The laser spot capture mode may have a relatively short exposure time to minimize the amount of signal resulting from ambient illumination, while detecting the location of the laser spot in the external scene 125. The laser spot capture exposure time may have an exposure delay synchronized with the time of arrival of the laser pulse reflection from the object of interest 134 based on the range to the object of interest 134. In some embodiments, the range used to set the exposure delay for the image sensor 114 may be estimated, or may be measured by the rangefinder 108.

It is to be understood that while the rangefinder 108, the illumination source 110, the laser light source 112, and the image sensor 114 are shown as being optically coupled with the external scene via the lens system 135, in some embodiments, one or more, or all of the rangefinder 108, the illumination source 110, the laser light source 112, and the image sensor 114 may be optically coupled with the external scene 125 via a separate optical port, lens system, or in any other suitable fashion such as via apertures or ports in the external housing 102.

The communications interface 116 may include a transceiver configured to exchange data or signals with one or more remote devices or processors, such as another object designator system 100, a satellite 126, a digital messaging system, a web server, an aircraft, or combinations thereof. The communications interface 116 may be configured to exchange data with a remote processor indicative of a presence, position, or location of an object of interest 134 in the external scene 125, a location of a laser spot in the external scene 125, ambient light level in the external scene 125, identifying information or position information for the object designator system 100, or combinations thereof.

In some embodiments, the communications interface 116 may include an input device such as a keypad, a touchscreen, control buttons, keys, or knobs, or combinations thereof, configured to receive user input and provide data indicative of the user input to the controller 120.

The display 118 is configured to provide an image or a sequence of images in a form visually perceivable by a user. It is to be understood that while the display 118 is shown as a viewfinder in FIG. 1, the display 118 may be implemented as an output device such as a liquid crystal display, a LED display, a video screen, a head-mounted display, a 3D display, a weapon sight, a smartphone, a tablet, a wearable display such as a smartwatch, a touchscreen, or combinations thereof. The display 118 may be coupled with the controller 120 via a wireless connection (e.g., Wi-Fi, near-field communication, or Bluetooth) or wired connection (e.g., a cable or port) in some embodiments.

The controller 120 is operably coupled with the components of the object designator system 100 and includes a processor 136 and a memory 138. The processor 136 may be implemented as at least one or one or more central processing unit, digital signal processor, semiconductor chip or circuit, field-programmable gate array (FPGA), applications-specific integrated circuit (ASIC), a multicore processor, or combinations thereof, and may include associated firmware or software stored in a non-transitory processor-readable medium.

The processor 136 is configured to access, read, and write processor-readable instructions and/or data to/from the memory 138 so as to carry out the functionality of the object designator system 100 as described below. The processor 136 is operably coupled with the power source 104, the rangefinder 108, the illumination source 110, the laser light source 112, the image sensor 114, the communications interface 116, and the display 118, so as to provide control signals and/or exchange data with the rangefinder 108, the illumination source 110, the laser light source 112, the image sensor 114, the communications interface 116, and the display 118.

The memory 138 is operably coupled with the processor 136 and may be implemented as a non-transitory processor-readable medium such as a hard disc, a flash memory, a read-only memory, a solid-state drive, or combinations thereof. The memory 138 stores processor-executable instructions as described below, and may store data as one or more data tables or structures. In some embodiments, the memory 138 may be implemented as a cloud memory, and may be remotely accessed by the processor 136 via the communication interface 116.

In one embodiment, the object designator system 100 may capture an initial image of the external scene 125 with variable exposure or integration time and exposure parameters optimized for human vision, such that the object of interest 134 is clearly visible or readily perceivable to a user. Long exposure time in the tens of milliseconds range enables operation of the object designator system 100 in low levels of ambient light illumination—approaching overcast starlight outdoors due to short-wavelength infrared (SWIR) nightglow illumination of the external scene 125. In some embodiments, a shorter exposure time may be used to properly expose external scenes 125 with brighter illumination such as during full sunlight. Further, in bright sunlight illumination, a relatively very short exposure time of about 1 microsecond may be implemented to minimize or substantially eliminate glints due to ambient light from images of the external scene 125. When images of the external scene 125 are captured in high levels of ambient light, a short exposure time results in the minimum amount of ambient illumination in the captured image of the external scene 125.

The object designator system 100 may further operate to detect laser spots such as a laser spot 150 by: (1) measuring the range to the object of interest 134, (2) setting an exposure delay so that the laser light pulse propagates to the object of interest 134 and returns within a predefined imaging sensor 114 exposure window. The propagation time from the laser light source 112 to the object of interest 134 and back may be used to set the exposure delay and may vary from a minimum distance (e.g., 50 m×2×3.33 microseconds/1000 m=0.333 microseconds) to a maximum distance (e.g., 5 km×2×3.33 microseconds/1000 m=33 microseconds) in some embodiments. The object designator system 100 may capture a laser spot image of the external scene 125 with the laser spot 150, followed closely by a spot baseline image of the external scene 125 without the laser spot 150. The controller 120 may then align (if needed) and compare the two images of the external scene 125 so as to detect the laser spot 150 and determine the location of the laser spot 150 in the external scene 125. The object designator system 100 may render, generate, or select a symbol indicative of the location of the laser spot 150 in the external scene 125, and generate an integrated image using the external scene image and the symbol of the location of the laser spot 150 in the external scene 125. The integrated image may be provided to a user via the display 118, and/or may be transmitted to one or more remote locations or processors via the communications interface 116.

As shown in FIG. 2, the rangefinder 108 may be operated by the controller 120 to emit a ranging light pulse 140 toward the object of interest 134 in the external scene 125, and to detect laser light pulse reflections 142 from the object of interest 134. The rangefinder 108 and/or the controller may determine a range 144 between the object of interest 134 and the object designator system 100. In some embodiments, the range 144 may vary between a minimum operating range (e.g., about 50 meters) and a maximum operating range (e.g., about 5 kilometers) for the object designator system 100. Further, the range 144 may be estimated, or may be determined by using the laser light source 112 and the image sensor 114 in some cases. Further, in some embodiments, the ranging light pulse 140 may be in the visible spectrum or the non-visible spectrum, and an image or a symbol indicative of the location of a laser spot from the ranging light pulse 140 may be provided to a user by the display 118 or may be visually observable by the user. In some embodiments, the ranging light pulse 140 may be in the non-visible spectrum, and a symbol indicative of a location of the laser spot from the ranging light pulse 140 may be generated by the controller 120 and provided to the user via the display 118.

The controller 120 may further cause the laser light source 112 to emit a laser light pulse 146 toward the object of interest 134 into the external scene 125 and may cause the image sensor 114 to detect laser pulse reflections 148 indicative of a location of the laser spot 150 in the external scene 125. It is to be understood that while the laser spot 150 is shown in FIG. 2 as located on the object of interest 134, the laser spot 150 may be located anywhere in the external scene 125 and may not be on the object of interest 134.

Figure 3:
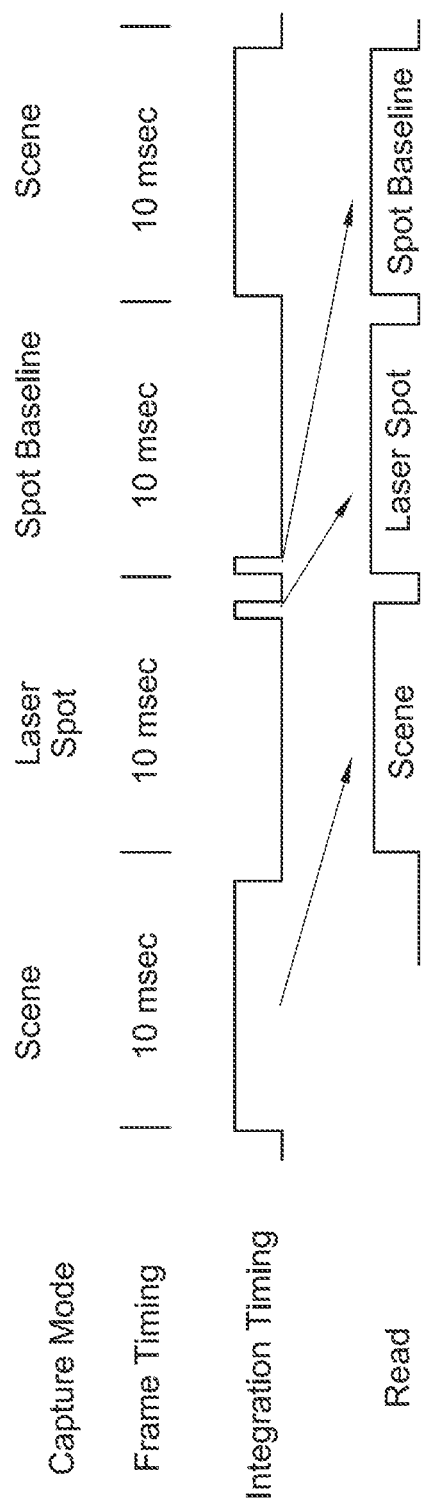
FIG. 3 is an exemplary image sensor timing diagram of an object designator system according to embodiments of the inventive concepts disclosed herein.

Referring now to FIG. 3, the image sensor 114 may be configured by the controller 120 to capture images in three repeating capture modes (i.e. Scene, Laser Spot, and Spot Baseline) with nominal 10 millisecond frame lengths or shorter for faster rate framing image sensors 114 or longer for slower framing image sensors 114. In some embodiments, the nominal frame lengths may be 16.7 milliseconds, for example.

In some embodiments, the image sensor 114 may be used to capture three separate images of the external scene 125 as follows. 1. An initial image of the external scene 125 with exposure selected for optimal human visualization. 2. A laser spot image of the external scene 125 with the laser spot 150 present on an object of interest 134 with detection timing selected to capture the laser spot 150 with minimum ambient light contribution to the detected signal. 3. A baseline image of the external scene 125 with the laser spot 150 absent or not present, but with substantially the same exposure parameters as the laser spot detection image of the external scene 125 with the laser spot 150 present.

The laser spot detection time may be positioned close to the end of a frame slot of the image sensor 114, and the spot baseline time is positioned close to the beginning of the next frame slot of the image sensor 114. This may function to minimize the amount of time that the object designator system 100 might move in handheld operation to minimize misalignment of the captured laser spot image and the spot baseline image.

In some embodiments, the controller 120 may process the captured laser spot image and spot baseline image by arithmetic pixel-by-pixel subtraction to remove the ambient signal contribution to the sensed values, with the result being essentially only the signal contributed by the laser spot 150. In some embodiments, pixel signal or image processing may be performed to improve the detection and location of the laser spot 150. The controller 120 may determine the location of the laser spot 150 in the external scene 125 based on the captured images, the determined range 144, and/or data from the positioning device 106.

Figure 4:
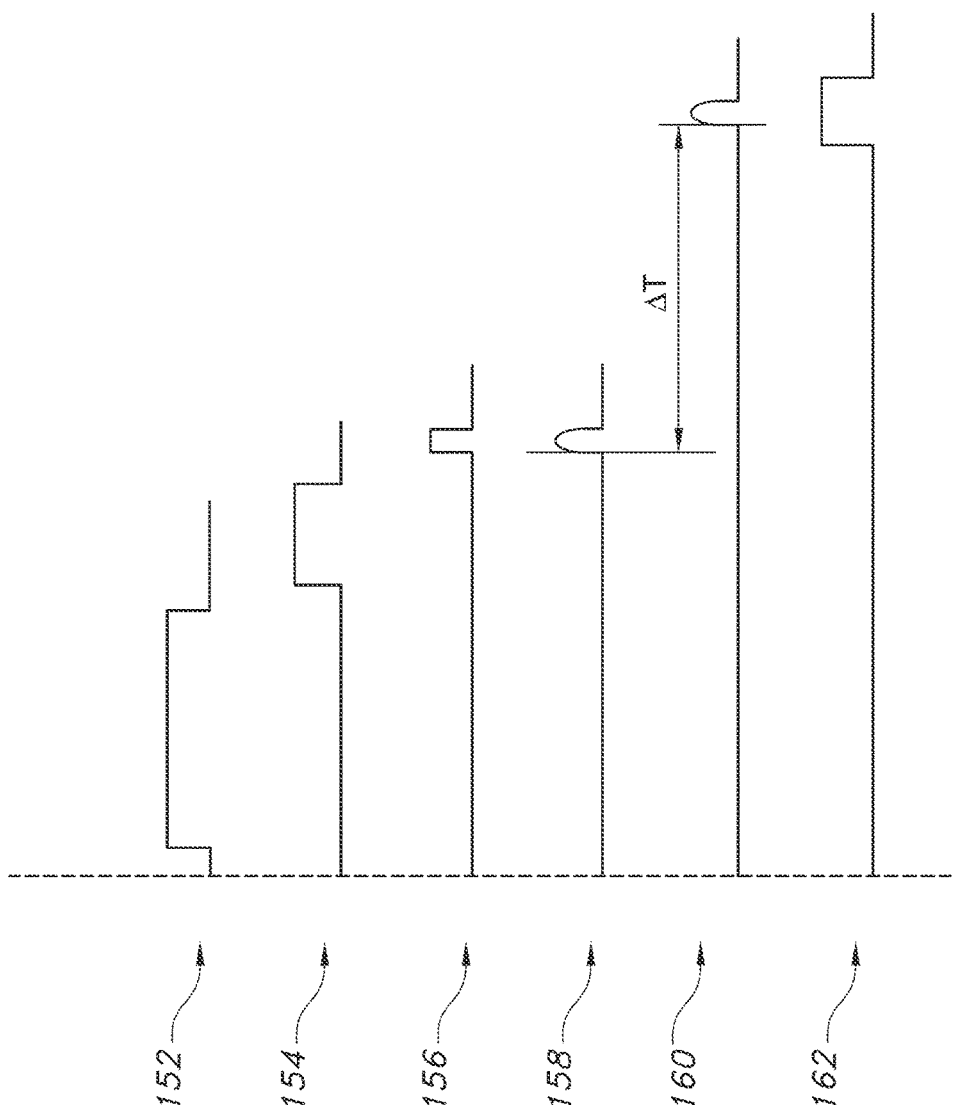
FIG. 4 is a laser spot capture timing diagram of an object designator system according to exemplary embodiments of the inventive concepts disclosed herein.

As shown in FIG. 4, the relative times of the controls and signals provided by the controller 120 to the laser light source 112 may be as follows. The relative timing shown in FIG. 4 is not to scale and is intended as a schematic only. The relative timing periods include a timing period 152 represents pumping the laser light source 112 power supply, or power supply charging, and may be about 10 microseconds.

The timing period 154 represents pulsing or driving the laser light source 112 and may be about 100 microseconds long following the timing period 152.

The timing period 156 represents pulsing of the laser light source 112 where the laser light source includes a Q-switched or short-pulse duration laser diode, and may be about 15 nanoseconds or less. Where the laser light source 112 is not a Q-switched laser, the timing period 156 may be omitted.

The timing period 158 represents the laser light out period, where a laser light beam is output in the external scene 125, and is also the pulse width. In some instances, the timing period 158 and the laser pulse width may be in the nanosecond range, such as about 15 nanoseconds. In some embodiments, the timing period 158 and the corresponding pulse width may vary from about 2 nanoseconds to about 100 nanoseconds.

The timing period 160 represents the laser light return from the external scene 125. Where the laser beam was directed toward the object of interest 134 such that the laser spot 150 is located on the object of interest 134, the timing period 160 represents laser light reflections from the object of interest 134. In some embodiments, the timing period 160 may range from about 330 nanoseconds to about 33 microseconds.

The timing period 162 represents the imaging sensor 114 active sensing window, where the image sensor 114 is activated by the controller 120 and detects any laser light pulses reflected from the external scene 125 and/or from the object of interest 134 to determine the location of the laser spot 150 in the external scene 125. In some embodiments, the timing period 162 may be in the microsecond range, such as 1 microsecond or longer. In some embodiments, the timing period 162 may vary between about 1 microsecond and about 10 microseconds. As shown in FIG. 4, the timing period 162 overlaps with the timing periods 158 and 160. In other words, the image sensor 114 is active when the laser light source 112 is emitting laser pulses in the external scene 125.

As shown, the timing period 162 is separated from the timing period 160 by ΔT. ΔT represents the time for the laser light pulse 146 to propagate from the laser light source 112 to the object of interest 134 and for the reflections 148 to propagate back to the image sensor 114. ΔT may be determined in advance by using the range finder 108 to measure the distance to the object of interest 136. As will be appreciated by persons of ordinary skill in the art having the benefit of the instant disclosure, in some embodiments ΔT may be estimated and the laser light source 112 may be iteratively pulsed and the image sensor 114 may sense the light return for operation without using the rangefinder 108. For instance, ΔT may be calculated by multiplying 6.67 microseconds/km multiplied by the determined range (in km) between the object designator system 100 and the object of interest 134. In some cases where the range is between about 50 meters and about 5 kilometers, the corresponding ΔT would be between 0.33 microseconds and about 33 microseconds.

Figure 5:
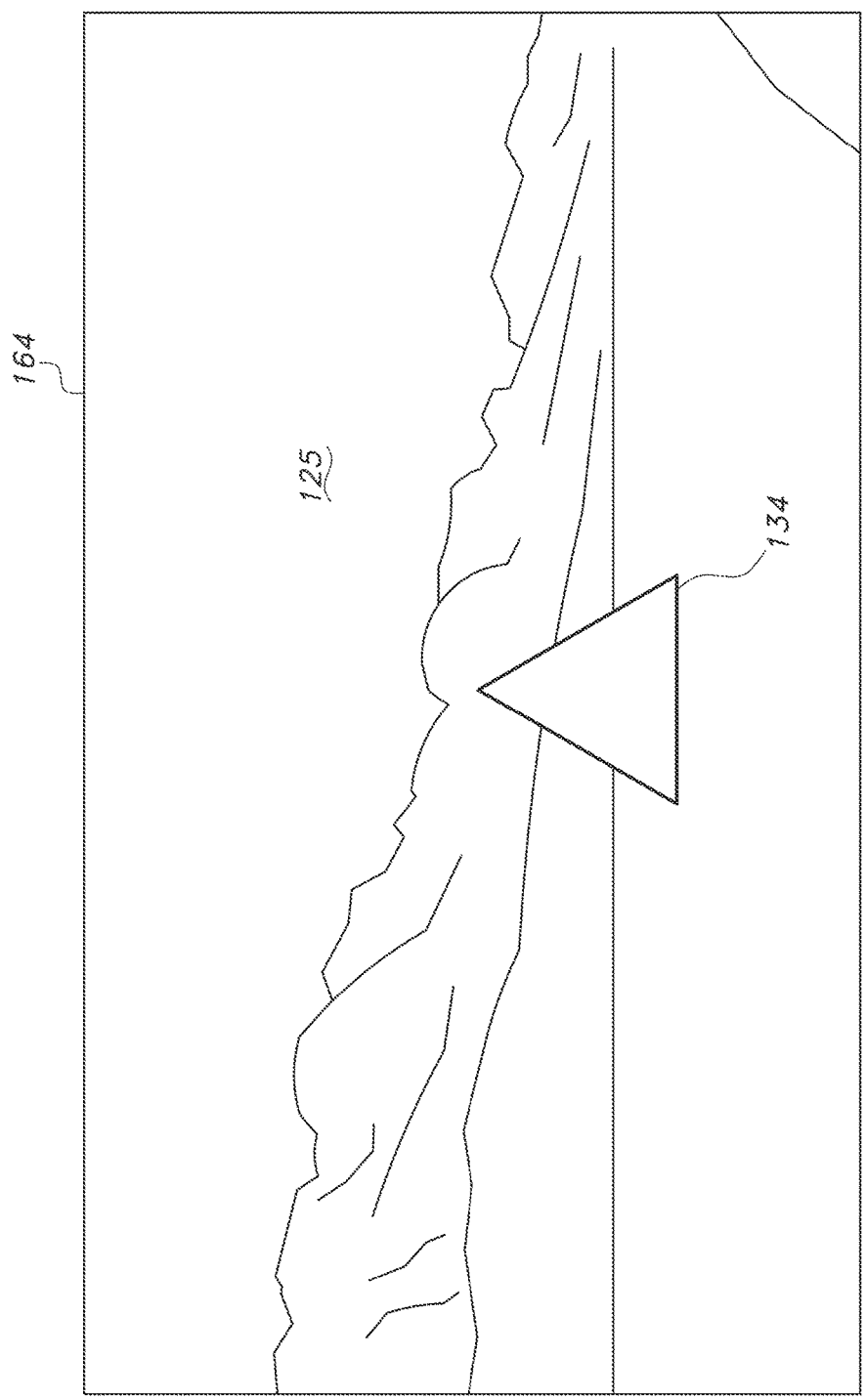
FIG. 5 is a diagram of an external scene image captured by an object designator system according to the inventive concepts disclosed herein.
Figure 6:
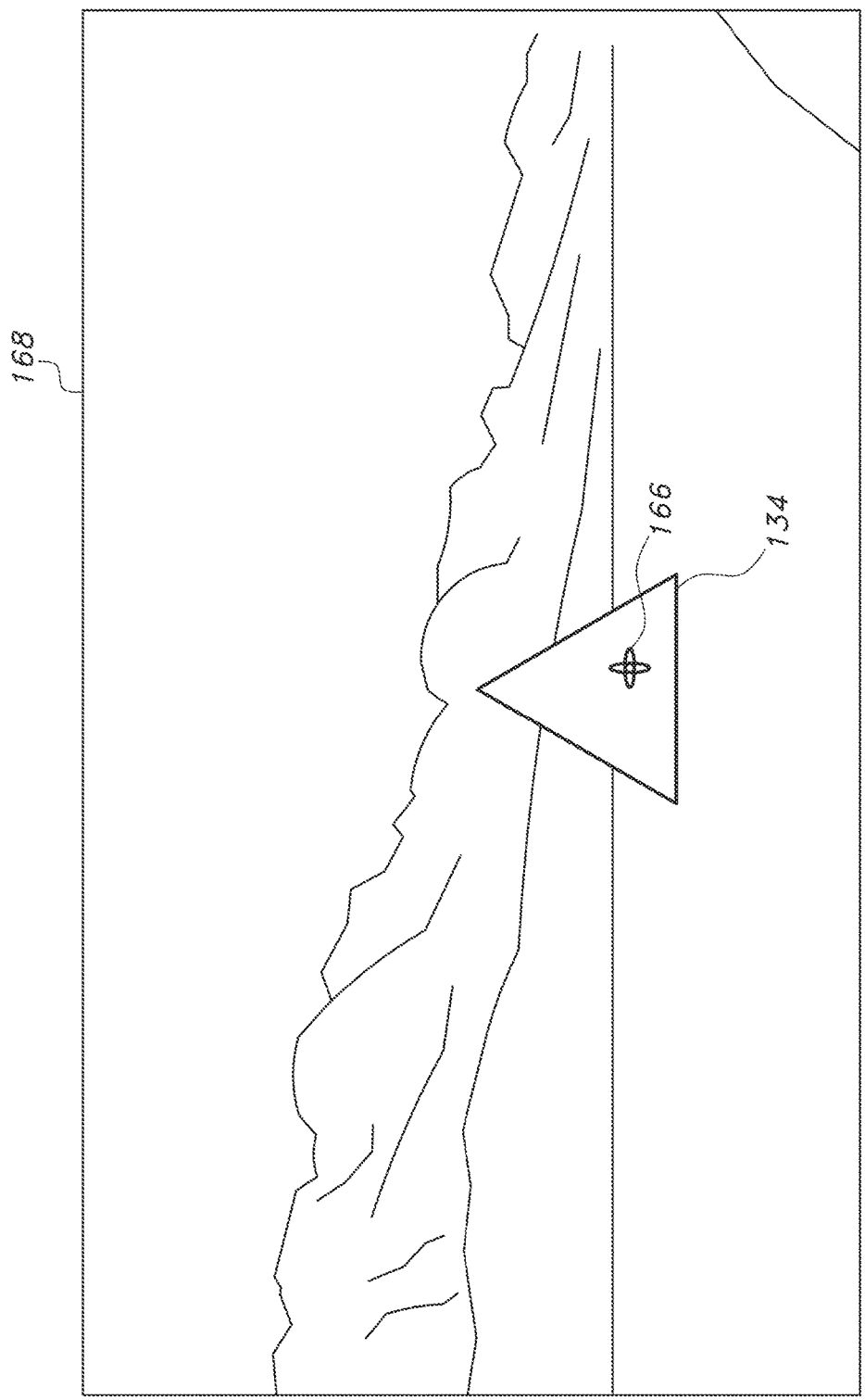
FIG. 6 is a diagram of an exemplary integrated image including a symbol indicative of a location of the laser spot in the external scene according to the inventive concepts disclosed herein.

Using the timing shown in FIGS. 3-4, the image sensor 114 may capture a scene image 164 as shown in FIG. 5, a laser spot image and a spot baseline image. The controller 120 may generate a symbol 166 indicative of the location of the laser spot 150 in the external scene 125, and may provide an integrated image 168 including the scene image 164 and the symbol 166 as shown in FIG. 6. The integrated image 168 may be provided to a user via the display 118 and/or may be transmitted to a remote location by the communications interface 106.

It is to be understood that while the symbol 166 is shown as a 4-point star in FIG. 6, the symbol 166 may be any desired symbol indicative of a location of the laser spot 150 in the external scene 125. For example, the symbol 166 may be a dot, a reticle, a circle, square, oval, X-shaped, or any other shape, size, or color symbol indicative of the location of the laser spot 150 in the external scene 125. In some embodiments, the symbol 166 may be a graphical symbol, a moving symbol, a flashing symbol, a 3D symbol, or combinations thereof. Further, the symbol 166 may include color-coding, alphanumeric or other label identifying the source of the laser spot 150 (e.g., friendly, enemy, unknown, another object designator system 100, or combinations thereof). In some embodiments, the object designator system 100 may generate a visual, audible, and/or haptic alert to notify users when the laser spot 150 is located onto the object of interest 134, or where the laser spot 150 is moving off the object of interest 134.

Figure 7:
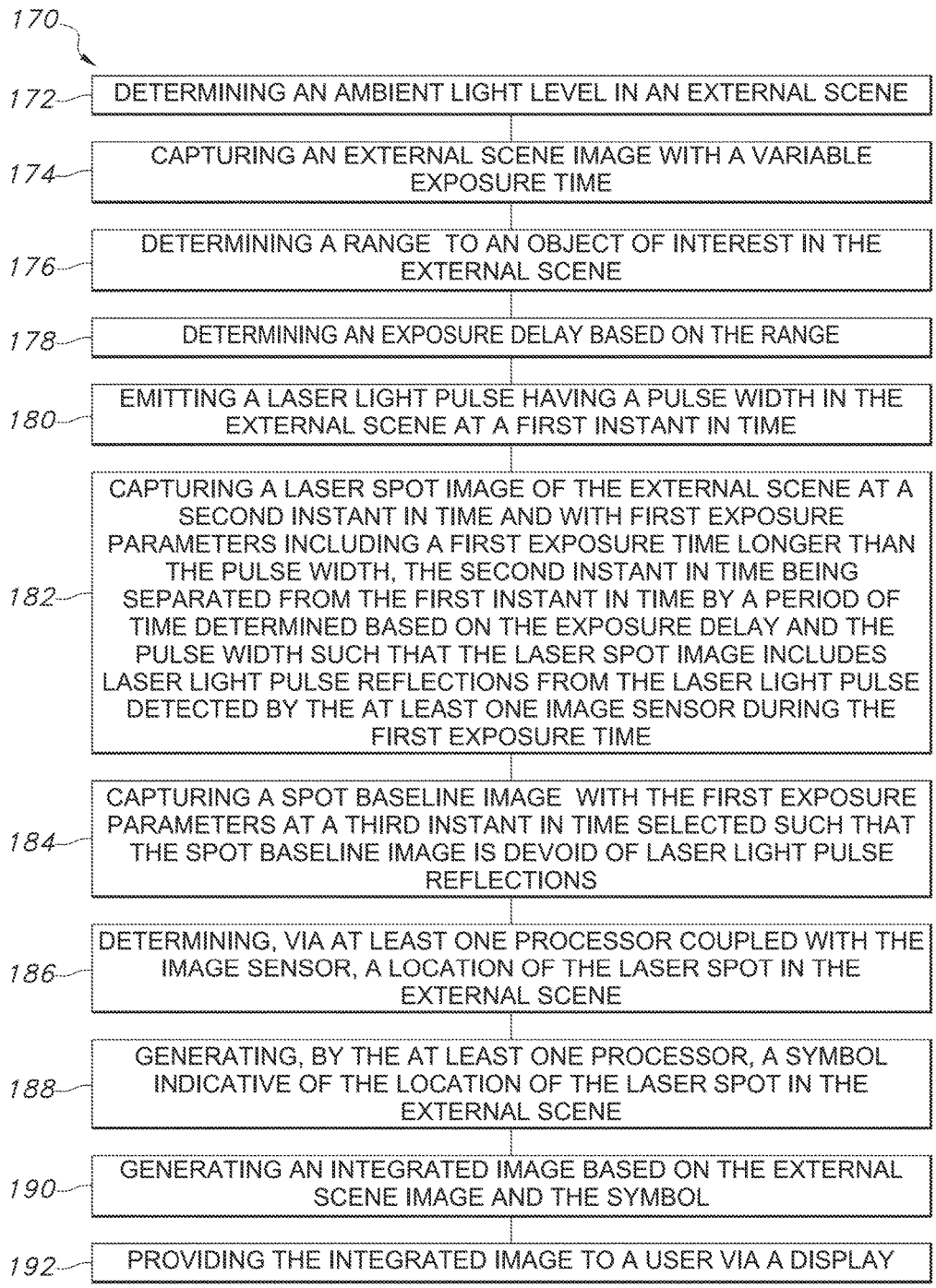
FIG. 7 is a diagram of an exemplary embodiment of a method of designating an object of interest according to the inventive concepts disclosed herein.

Referring now to FIG. 7, an embodiment of a method 170 for designating an object that may be carried out by an object designator system 100 according to the inventive concepts disclosed herein in shown. The method 170 may include one or more of the steps described herein, which one or more steps may be carried out in any desired order including being carried out simultaneously with one another. For example, two or more of the steps disclosed herein may be combined in a single step and/or one or more of the steps may be carried out as two or more sub-steps. Further, steps not expressly disclosed or inherently present herein may be interspersed with or added to the steps described herein, or may be substituted for one or more of the steps described herein as will be appreciated by a person of ordinary skill in the art having the benefit of the instant disclosure.

A step 172 may include determining an ambient light level in an external scene, such as by using an image sensor or a light detector to measure the ambient light level in the external scene. The ambient light level may be determined as $kW/m^2$ or lux in some embodiments, or may be correlated to a level selected from a table or set of predefined ambient light levels. Where the determined ambient light level is below a predetermined threshold, this step may further include activating an illumination source to increase the light level in the external scene to a desired level. In some embodiments, step 172 may be omitted.

A step 174 may include capturing via the image sensor, an external scene image with a variable exposure time. The variable exposure time may be based on the ambient light level in the external scene and may be selected such that the external scene image is visible to the user, or is optimized for visual perception by the user. The variable exposure time may be decreased in response to an increase in the ambient light level in the external scene so as to minimize ambient light glints in the external scene image.

A step 176 may include determining a range to the object of interest in the external scene, such as by using a rangefinder. Determining the range to the object of interest may include emitting a laser light pulse toward the object of interest via the rangefinder, and detecting a reflection of the laser light pulse from the object of interest via a light detector or an avalanche photodiode.

A step 178 may include determining an exposure delay based on the determined range to the object of interest.

A step 180 may include emitting, via a laser light source, a laser light pulse having a pulse width in the external scene at a first instant in time. In some embodiments the pulse width may be in the nanosecond range and the first exposure time is in the microsecond range. For example, the pulse width may be between about 15 nanoseconds and about 30 nanoseconds.

A step 182 may include capturing, via the image sensor, a laser spot image of the external scene including laser light pulse reflections from the external scene at a second instant in time and with first exposure parameters including a first exposure time, the first exposure time being longer than the pulse width, and the second instant in time being separated from the first instant in time by a period of time determined based on the exposure delay and the pulse width such that the laser spot image includes laser light pulse reflections from the laser light pulse detected by the image sensor during the first exposure time.

A step 184 may include causing the image sensor to capture a spot baseline image of the external scene with the first exposure parameters at a third instant in time selected such that the laser spot baseline image is devoid of the laser light pulse reflections.

A step 186 may include determining, via a processor coupled with the image sensor, a location of a laser spot in the external scene based on the laser spot image and the spot baseline image.

A step 188 may include generating, by the processor, a symbol indicative of the location of the laser spot in the external scene.

A step 190 may include generating, by the processor, an integrated image based on the external scene image and the symbol.

A step 192 may include providing the integrated image to a user via a display.

In some embodiments, the method 170 may also include determining, via a position device coupled with the processor, a position and an orientation of the image sensor relative to at least one of: the external scene and the object of interest in the external scene. Further, in some embodiments the method 170 may include transmitting data indicative of at least one of: a location of the object of interest in the external scene and the location of the laser spot in the external scene to a remote processor, via a communications interface coupled with the processor.

As will be appreciated by a person of ordinary skill in the art having the benefit of the instant disclosure, object designator systems and methods according to embodiments of the inventive concepts disclosed herein may provide lightweight and portable object designator that can detect a laser spot in a variety of ambient light levels including full sunlight, and that allow users to reliably and easily designate a desired object, detect a laser spot in the external scene, and steer or direct a laser spot to a desired object of interest.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An object designator system, comprising:
a rangefinder, the rangefinder including a pulsed light source and a light detector, the rangefinder configured to determine a range to an object of interest in an external scene;
a second laser light source configured to emit laser light pulses in the external scene;
at least one image sensor configured to capture an image of the external scene and to detect laser light reflections from the laser light pulses emitted from the second laser light source from the external scene;
a global positioning system receiver configured to determine a position of the object designator system;
an inertial measurement unit configured to determine orientation of the object designator system;
a display configured to provide at least one image to a user; and
at least one processor operably coupled with the rangefinder, the second laser light source, the at least one image sensor, the display, the global positioning receiver, the inertial measurement unit, and with a non-transitory processor-readable medium storing processor-executable code for causing the at least one processor to:
transmit a first control signal via a computer port to the at least one image sensor to cause the at least one image sensor to capture an external scene image with a variable exposure time selected such that the external scene image is visible to a user;
receive the range determined by the rangefinder to the object of interest located in the external scene;
determine and set an exposure delay based on the range determined by the rangefinder to the object of interest;
cause the second laser light source to emit a laser light pulse having a pulse width into the external scene at a first instant in time;
cause the at least one image sensor to capture a laser spot image of the external scene including the laser light pulse reflections from the external scene at a second instant in time and with first exposure parameters including a first exposure time, the first exposure time being longer than the pulse width, and the second instant in time being separated from the first instant in time by a period of time determined based on the exposure delay and the pulse width such that the laser spot image includes laser light pulse reflections from the laser light pulse detected by the at least one image sensor during the first exposure time;
cause the at least one image sensor to capture a spot baseline image of the external scene with the first exposure parameters at a third instant in time selected such that the spot baseline image is devoid of the laser light pulse reflections;
determine, based on the laser spot image and the spot baseline image, a location of the laser spot in the external scene in relation to the position and orientation of the object designator system;
generate a symbol indicative of the location of the laser spot in the external scene and render the symbol onto the external scene image to generate an integrated image including the initial image of the external scene and the symbol indicative of the location of the laser spot in the external scene; and
provide the integrated image to a user via the display.

2. The object designator system of claim 1, further comprising a communications interface coupled with the at least one processor, the communications interface configured to transmit data indicative of at least one of: a location of the object of interest in the external scene and the location of the laser spot in the external scene to a remote processor.

3. The object designator system of claim 1, wherein the symbol indicative of the location of the laser spot in the external scene is a graphical symbol.

4. The object designator system of claim 1, wherein the symbol indicative of the location of the laser spot in the external scene is a portion of the laser spot image corresponding to the location of the laser spot in the external scene.

5. The object designator system of claim 1, wherein the at least one image sensor is configured to operate in one or more modes selected from: a visible mode (VIS), a near infrared (NIR) mode, and a shortwave infrared (SWIR) mode.

6. The object designator system of claim 5, wherein the laser light pulse has a wavelength of between about 1000 nm and about 1700 nm.

7. The object designator system of claim 1, wherein the pulse width is in the nanosecond range and the first exposure time is in the microsecond range.

8. The object designator system of claim 7, wherein the pulse width is between about 2 nanoseconds and about 100 nanoseconds, and wherein the first exposure time is about 1 microsecond.

9. The object designator system of claim 1, wherein the laser light pulse is in the non-visible spectrum.

10. The object designator system of claim 1, further comprising a communications interface coupled with the at least one processor, the communications interface configured to transmit data indicative of the integrated image to a remote processor.

11. The object designator system of claim 1, wherein the variable exposure time is inversely related to an ambient light level in the external scene.

12. The object designator system of claim 1, further comprising a housing configured to contain components of the object designator system.

13. The object designator system of claim 12, wherein the housing is substantially cylindrical.

14. The object designator system of claim 13, wherein the housing is about three inches in diameter and about nine inches in length.

15. The object designator system of claim 1, wherein the inertial measurement unit is a micro electro-mechanical system which includes a processor and one or more microsensors.

16. The object designator system of claim 1, further comprising a power source, the power source including a rechargeable battery.

\* \* \* \* \*